Aug. 18, 1936.  G. ARSNEAU  2,051,195
SAWING MACHINE
Filed Nov. 15, 1933  4 Sheets-Sheet 1
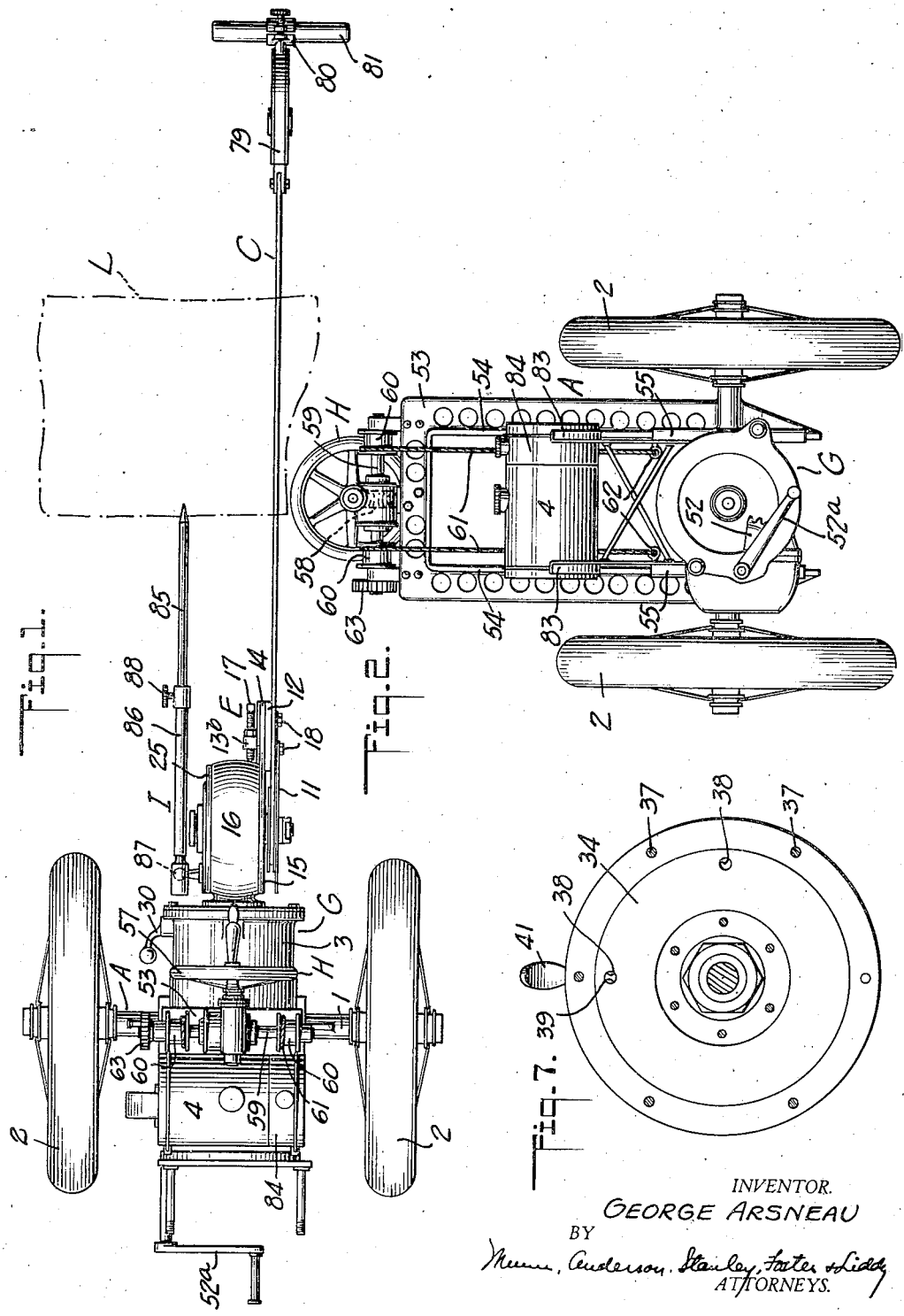
INVENTOR.
GEORGE ARSNEAU
BY
ATTORNEYS.

Aug. 18, 1936.　　　　G. ARSNEAU　　　　2,051,195
SAWING MACHINE
Filed Nov. 15, 1933　　　　4 Sheets-Sheet 2
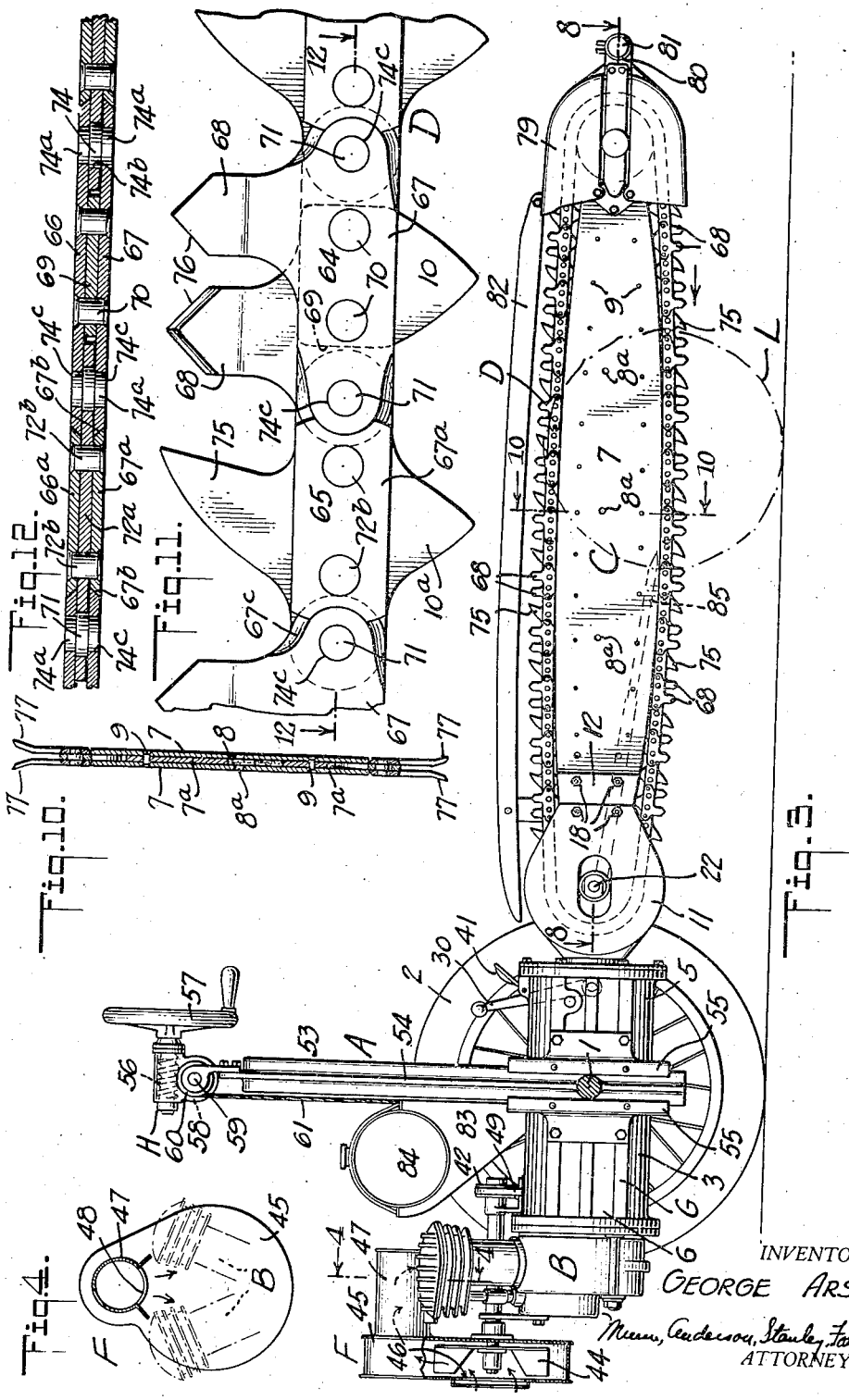
INVENTOR.
GEORGE ARSNEAU
ATTORNEYS.

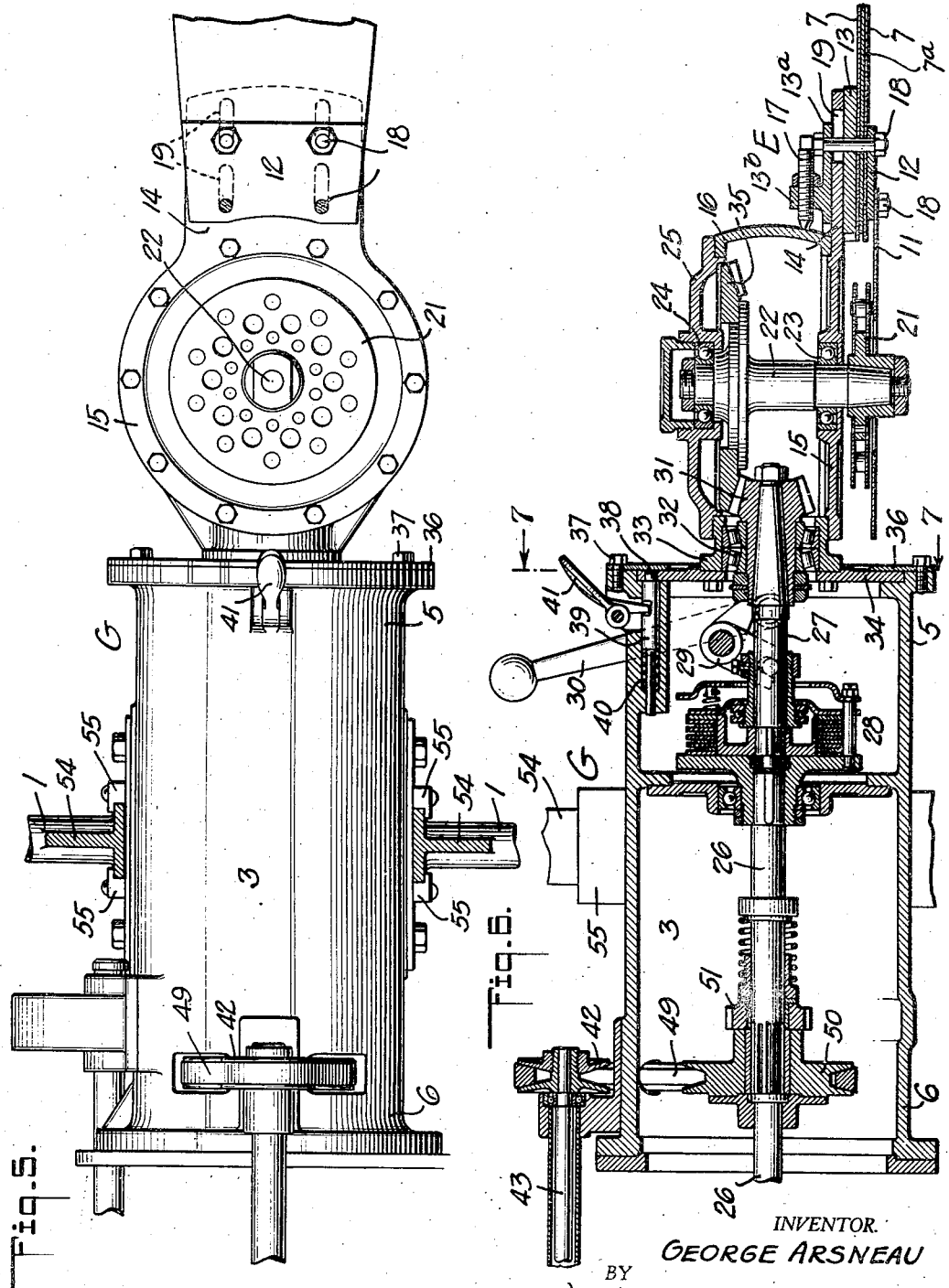

Aug. 18, 1936.   G. ARSNEAU   2,051,195
SAWING MACHINE
Filed Nov. 15, 1933   4 Sheets-Sheet 4
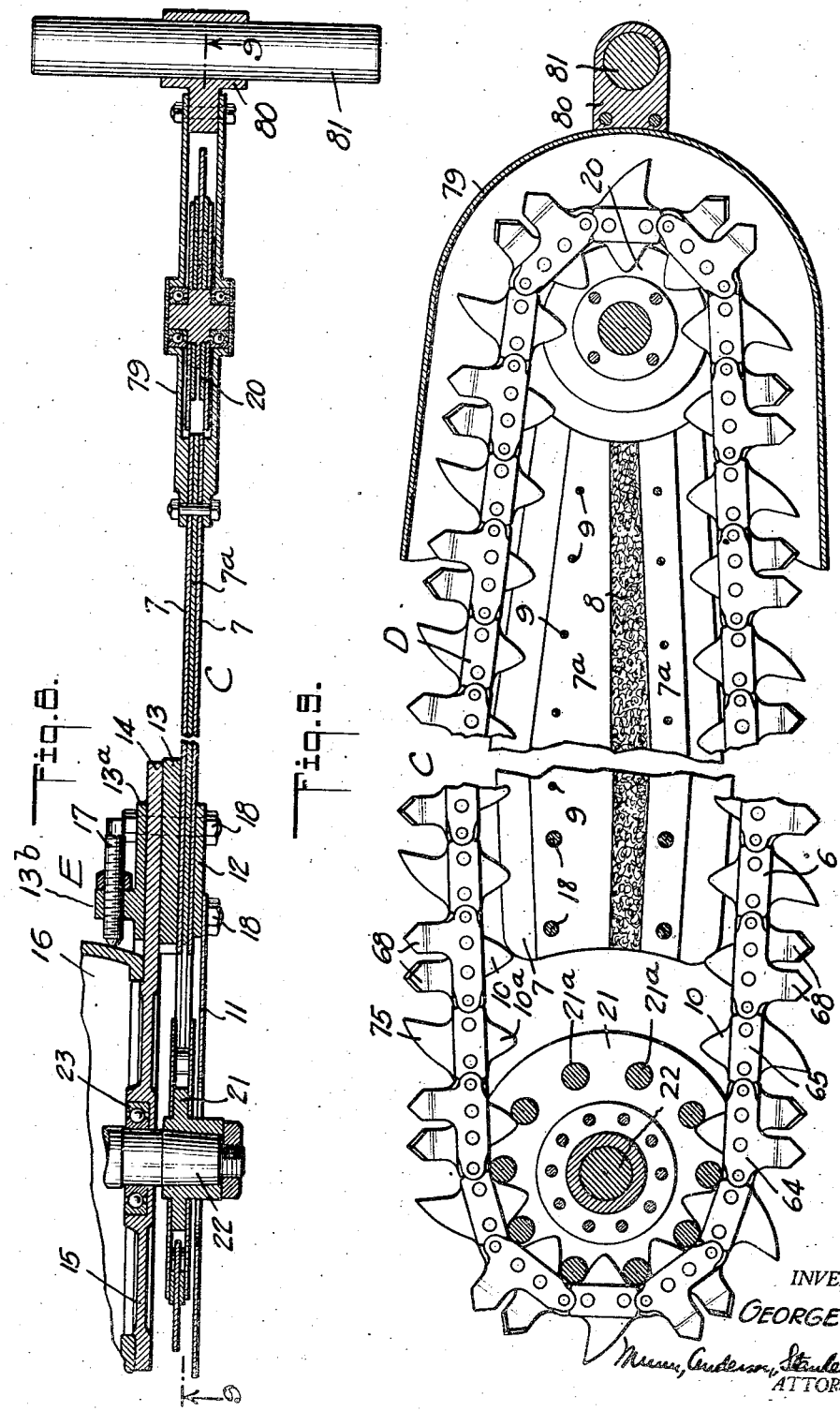
INVENTOR.
GEORGE ARSNEAU
ATTORNEYS.

Patented Aug. 18, 1936

2,051,195

UNITED STATES PATENT OFFICE 2,051,195

SAWING MACHINE

George Arsneau, Los Angeles, Calif., assignor, by mesne assignments, to Dow Power Saw Company, a corporation of California Application November 15, 1933, Serial No. 698,186

3 Claims. (Cl. 143—32)

This invention relates to sawing machines, and it refers particularly to machines for cutting timber.

An object of the invention is to simplify the construction of such machines and provide a functionally novel organization of cooperable parts by which timber may be cut parallel to any one of a number of angularly related planes and at various elevations on the work, and with great speed, utmost ease and convenience, and with the assistance of a single operative.

Another object of the invention is to provide a saw carrier or mounting which may be easily fulcrumed about a supporting axis in such manner as will cause the cutting edge of the saw to be advanced against the work with little or no appreciable manual exertion regardless of the angle of the cut being made.

Important features of the invention reside in the construction of a machine which can be readily transported over the ground from one place to another, as the occasion requires, and the saw quickly correlated with its work; and the provision of means so arranged and designed that when the work to be performed consists in cutting standing trees, the saw may be definitely held relatively thereto so as to effect a cut at a point very close to the ground, and, in fact, closer than is possible with the well-known form of cross-cut saw.

A still further object of the invention resides in the novel manner of mounting a power plant upon mobile means, and the use of a scheme in a saw assembly which, by reason of its weight, plus a desirable leverage action, will effectively function to overbalance the weight of the power plant, relative to a common fulcrum, so that the saw will be urged vertically downwards and about said fulcrum when effecting certain predetermined cuts, with the result that the saw will, to a very large extent, be effectively fed against the work, thus eliminating considerable manual exertion during the cutting operation.

A further object is to provide a mobile sawing machine in which the parts employed are so organized, designed, constructed and arranged as to enable the machine to be successfully used in places where the operating space is small, such, for instance, as the space which separates adjacent trees in a somewhat densely developed forest.

Another object is to provide a sawing machine of sturdy construction which may be rather roughly handled without fear of premature destruction of the working parts thereof, and one which is of light weight that is capable of being drawn over the ground by a single operator and readily related in an operative position to the work to be operated upon.

The invention consists in other novel features, arrangements and combinations of parts, and certain sub-combinations hereinafter described and claimed.

Reference is to be had to the accompanying drawings forming a part of this specification, in which similar characters of reference indicate corresponding parts in all the views.

In the drawings,

Figure 1 is a plan view of one form of sawing machine embodying the invention;

Figure 2 is a view of the sawing machine in end elevation;

Figure 3 is a view in side elevation of the complete sawing machine with parts broken away and parts in section;

Figure 4 is a section taken substantially on line 4—4 of Figure 3;

Figure 5 is a fragmentary view in elevation, on an enlarged scale, with parts in section, of the transmission and illustrating also the manner of mounting the saw frame to the front end of the housing;

Figure 6 is a view taken substantially on line 6—6 of Figure 5, showing parts in full lines;

Figure 7 is a transverse section on line 7—7 of Figure 6;

Figure 8 is a section taken on a horizontal plane through the saw frame and illustrating the manner of connecting same to fulcrum upon the gear case and illustrating, in addition thereto, the means employed for tensioning the belt;

Figure 9 is a view, partly in vertical section and partly in elevation, of certain of the parts shown in Figure 8;

Figure 10 is a section on line 10—10 of Figure 3;

Figure 11 is a view in elevation showing on an enlarged scale a section of the chain saw;

Figure 12 is a section on line 12—12 of Figure 11.

*General organization.*—In practice, use is made of fulcrum means, preferably in the form of a portable carriage or support A; a power plant B of the nature of an internal combustion engine; a saw assembly C including preferably, but, it is thought, not necessarily, a chain saw D, and in conjunction with said saw, mechanism E is employed for tensioning the saw. F is a cooling system for the power plant, and G is a transmission by means of which motion will be taken into the saw to drive same at high speed. H is a raising and lowering mechanism for the saw assembly and I is a means for maintaining a definite working relationship of the machine to its work during movement of the saw assembly in a predetermined plane.

*Fulcrum means.*—The fulcrum means A preferably comprises a wheeled carriage whose horizontal axle 1 has mounted thereon supporting wheels 2—2, to allow for convenient portability of the entire equipment or organization of parts employed. However, this not only furnishes satisfactory means by which the machine may be readily transported from one place to another, but it essentially enables the saw assembly C to fulcrum both about the horizontal axis of the wheels 2—2 and about, let us say, an imaginary vertical axis which latter is located approximately midway between said wheels and in a line which intersects the said horizontal axis. It is important that we remain mindful of this characterizing feature of the so-called fulcrum means, because it will soon be appreciated that I treat it as significant and of great importance in a general scheme of things which lends to the accomplishment of highly desirable functional features which I consider new and not heretofore accomplished by others. This feature is described and claimed in my co-pending application entitled "Positioning and supporting means for portable saw," filed January 30, 1934, bearing Serial No. 708,984, which is a division of this application.

*Power plant.*—The power plant B is in the form of an internal combustion engine situated at one side of a line drawn perpendicularly through the aforestated fulcrum means A. It forms part of transmission housing 3 and same is intended to be supplied with fuel from a tank 4 carried by said housing. Said housing occupies a position at right angles to the perpendicular, as will be seen on reference to Figure 3 of the drawings, and it has what, in this instance, can be properly called a front or forwardly extending end 5 and a rearwardly extending end 6, which latter is attached to the crank case of the power plant B.

*Saw assembly.*—The saw assembly C comprises a rigid frame structure which includes companion plates 7—7 having interposed therebetween filler plates 7a—7a and a longitudinal wick 8, such as a strip of felt or like porous material, the plates 7—7 and 7a—7a being riveted together at 9 or otherwise connected with each other in a suitable well-known manner. This construction is such that a lubricant holder is formed between said plates for the retention of lubricant. For this reason, the plates are formed with supply perforations 8a into which the nozzle of a lubricant container or force feed gun (not shown) may be introduced and lubricant supplied to the wick to a point of over-saturation thereof, whereby there will exist a tendency of the lubricant to seek egress towards the open side of the saw-carrying frame. Now, it will be observed that the chain saw D has its sprocket teeth 10 and 10a disposed to operate in the space between said plates 7—7 as the saw operates over a regularly defined course and in so doing, lubricant will be collected thereby. It is thus proposed that the cutting edge of the saw shall be maintained constantly in a well lubricated condition.

Forming a part of the frame structure of this saw assembly is a cheek plate 11, filler plate 12, sliding means 13—13a, and the extension 14 of the cover plate 15 of a gear housing 16. The sliding means 13a carries a fixed lug 13b in which a screw 17 is mounted so as to engage at one of its ends against an adjacent wall of the gear housing (see Figures 6 and 8). Passing through the plate 12 and mounted to move with the means 13 are clamping bolts 18, the latter passing through the longitudinal guide slots 19 in the extension 14 of the housing plate 15. It follows that when the bolts 18 are loosened, movement in a longitudinal direction can be imparted to the frame of the saw assembly. The structural features just referred to largely make up the saw tensioning means E. The saw is trained over an idler 20 at the front of the frame of the saw assembly and over a sprocket gear 21 on a driven spindle 22, the latter passing through a longitudinal slot 11a in the plate 11 and journaled in a bearing 23 carried by the housing head 15 and in a bearing 24 carried by the opposite head 25 of said housing. Because of this manner of mounting the spindle 22, it will be appreciated that when longitudinal movement is imparted to the frame structure of the saw assembly, the idler 20 will move relatively to the sprocket gear 21, whereby to enable the chain saw to be readily tensioned when the exigency therefor arises.

*The transmission.*—The housing 3 accommodates the drive shaft 26 of the power plant B and a driven shaft 27, the former adapted to transfer power to the latter through a clutch 28 of the multiple dry disk type. This clutch may be operated in any suitable well known manner, such as the rocker 29 whose movement may be controlled by a manually operable shift lever 30. The driving bevel gear 31 turns in bearings 32 contained in a cylindrical extension 33 which forms part of a swiveled head 34 at the aforestated front end of the housing 3 and it meshes with a large bevel gear 35 fixed to the spindle 22. The head 34 is maintained in position at the front end of the housing by a retaining ring 36 removably secured to the housing by machine screws 37. I have, in this way, provided for rotary movement being set up in the head 34 and because of the fact that this head fixedly connects with the gear housing 16, the latter is adapted to move with the frame of the saw assembly, thus enabling the said frame to be angularly tilted or adjusted in order that it may occupy different angularly related planes depending upon the cut intended to be produced. The head 34 is formed with an annular series of keeper apertures 38 and selectively co-operable therewith is a reciprocal latch bolt 39 which may be retracted from an engaged aperture against the normal force of a spring 40, by means of a manipulating lever 41.

*Cooling system.*—Because of the high speed at which the power plant is driven, it follows that it is quite essential that the cylinders thereof be maintained in a cool working condition, and I find that this desire may be satisfied in a most excellent manner by utilizing the power of the drive shaft 26 to drive a pulley 42, the latter secured to a shaft 43 on which is mounted a fan 44. This fan operates in a casing 45 into whose open side 46 air will be drawn and then forced through a duct 47 of said casing, thence out of a flared discharge throat 48, at which time it will be effectively distributed into the V space between the cylinders of said power plant, and against the cooling fins of the engine cylinders with highly beneficial results. A power transferring belt 49 connects the pulley 42 with a larger pulley 50 which is splined to the drive shaft 26. A starter pinion 51 on the drive shaft 26 is adapted to co-act with a gear segment 52 of a conventional form of "kick starter" whose foot-actuated element 52a occupies a convenient position at the rear end of the machine, to set the power plant in operation.

*Raising and lowering means.*—In order that the saw may be adjusted vertically and to thereby effect cuts at various elevations on the work, I provide the axle of the fulcrum means A with an inverted U-shaped hoist frame 53 having longitudinal guide rails 54 on which are movable the guide flanges 55. These guide flanges are a fixed part of the transmission housing as will be best observed on reference to Figure 3. At the upper end of the frame 53 is a worm gear 56, which carries a crank wheel 57 in order that it may be readily turned. This worm gear meshes with a gear 58 on a shaft 59 at said upper end of the frame 53, and this shaft carries reels 60—60, each operatively accommodating a hoisting cable 61 so that it may be wound up or paid out according as the wheel 57 is turned in one direction or another. The lower ends of these cables are attached at 62 to the guide flanges 55. The shaft 59 is equipped with a ratchet detent mechanism 63 which functions to positively latch the worm 56 against turning.

*The chain saw.*—The chain saw D employed herein is essentially characterized by links 64 and 65, the former consisting of substantially similar long-length plates 66 and 67, each having a cutting tooth 68, and interposed between said plates 66 and 67 is a short length plate 69. The sprocket teeth 10 of the chain are formed on said plates 69 and, as shown, the teeth 68 of the respective plates 66 and 67 are laterally spaced apart from each other for a distance equal to the thickness of the plate 69, and said teeth are staggered relatively to each other. Rivets 70 pass through the plates 66, 67 and 69.

The links 65 are each formed of outer short length plates 66a, 67a, and an intermediate long-length plate 72a, so that the extremities of the latter will extend an appreciable distance beyond the adjacent ends of the plates 66a and 67a. On reference to Figure 12 of the drawings, it will be noted that the short length plates 66a and 67a of the links 65 have the edge portions of their respective ends mitered at 67b to overlap the oppositely mitered edges 67c of the long length plates 66 and 67 of the links 64, the purpose of which will appear presently.

The plates 66a, 67a and 72a of the links 65 are securely riveted together at 72b in a manner like that employed for securing together the plates 66, 67 and 69 of the links 64. I hinge the links 64 to the links 65 by hinge pintles 71. These pintles are each formed with an intermediate cylindrical portion 74 and reduced oppositely extending cylindrical portions 74a. The portions 74 are set into bearing passages 74b in the extremities of the plates 72a of the links 65, and the reduced portions 74a are extended into alined apertures 74c in the extremities of the long plates 66 and 67 of the companion links 64. It is intended that the hinges thus formed shall be very flexible, and with this end in view, the width of the peripheral face of each pintle portion 74 is sufficiently in excess of the thickness of the plate 72a into which it is set as to provide such clearance between the inner faces of the extremities of the plates 66 and 67 and the opposite flat faces of the extremities of the plates 72a, whereby to avoid as well as possible undue frictional engagement of these faces with each other. Now by mitering the edges of the aforestated plates 66 and 67 and 66a and 67a, the extreme ends of these plates are confined against relative lateral movement, so as to prevent the reduced ends of the hinge pintles from leaving their apertures 74c. The construction of the chain is also such that it is of uniform thickness throughout and smooth faced at its respective sides. The knuckle joint construction of the hinges and the perfectly flush disposition of the outer ends of the pintles relatively to the said opposite sides of the chain, enable me to avoid the production of surface obstructions that would offer resistance to the intended high speed movement of the saw.

As shown, the intermediate plates 72a of the links 65 are formed to provide the sprocket teeth 10a and these plates are also formed to provide drag or cleaner teeth 75, the latter occupying positions in line longitudinally with the spaces between the mating cutting teeth 68 of the links 64. The respective cutting teeth 68 are V-shaped, sharpened along their edges 76, and same are flared laterally from each other as at 77, so that the effective cutting edge of the saw will produce a cut of a width through which the thin frame structure of the saw assembly will freely pass as the saw progresses through the work. The chain saw hereinabove described is described and claimed in my co-pending application entitled "Chain saw", filed January 30, 1934, bearing Serial No. 708,982, which is a division of this application.

*Work retaining means.*—The work retaining means I comprises a sharp-ended thrust rod 85 which is telescopically connected with a rigid tube 86. This tube is supported from a ball and socket joint 87, whose ball element is mounted upon an adjacent side of the gear casing 16. A set screw 88 at the outer end of the tube 86 may be firmly advanced against the thrust rod to hold same in a desired position of longitudinal adjustment. It follows that this thrust rod is thus free for vertical swinging movement and for movement toward the work to be held during the time that the chain saw is in operation. In Figure 1, I show in dotted lines a log, the position of which is horizontal such as will enable the saw to make a vertical cut. Here it will be noted that the thrust rod 85 has been moved to a position where the pointed free end thereof effectively penetrates the log, thereby holding the log in a fixed cutting relationship to the carriage of the machine. From the fact that the thrust rod may tilt in a vertical direction, the same will readily be adapted to a movement of the saw frame vertically downwards as the frame is turned about its horizontal axis.

*Miscellaneous structural and functional features.*—At the front or operator's end of the saw assembly C is a hand and body guard 79 which constitutes a part of the saw-carrying frame of said assembly, and same passes over the saw to approximately the extent illustrated clearly in Figure 9 and with ample clearness between the inner walls of said guard and the cutting edge of the saw. A tubular member 80 at said operator's end of the saw frame accommodates a hand grip 81 in the form of a transverse bar, it being intended that it be used when moving the saw frame on its fulcrum, as well as when (1) angularly adjusting the frame to assume a predetermined position, as when the frame is turned about the axis of the bevel gear 31, or (2) when transporting the machine from one place to another or when adjusting the machine to the work. A guard member 82 is supported by the frame of the saw assembly and same occupies a position to protect one against injury by contact with the cutting edge of the saw. It is thus manifest that all of the saw except the part thereof which of necessity must be exposed for duty is concealed in a manner that will reduce the possibility of injury to the person of the operator or persons standing in close proximity to the saw to a reasonable minimum.

As a matter, mostly, of convenience, the saddle means 83 which supports the fuel supply tank 4 also supports a lubricant supply tank 84 by means of which lubricant will be readily available when a need therefor arises, such as when lubricant should be supplied to the crank case of the power plant.

Having fully described the several structural and functional features of the invention, the operation thereof will be given as follows:

In Figure 3 the saw assembly is in a position to dispose the saw to effect a vertical cut, at which time the latching bolt 39 co-acts with its keeper aperture 38 to hold the assembly in its position of angular adjustment. It has elsewhere been stated that the saw assembly projects laterally from one side of the support A on which it is mounted, and that the power plant B is situated laterally in an opposite direction at the other side of the said support. This saw assembly is quite long as compared with the over-all distance of the power plant from the vertical center of the support.

In consequence thereof, the assembly overbalances the weight of the power plant and same tends to move vertically downwardly when in a position to effect a vertical cut, as shown in Figure 3. Assume that the assembly has first been tilted vertically upwards about the horizontal axis of the support or fulcrum means A and that a log has been placed in a horizontal position beneath the cutting edge of the chain saw D with the log in direct contact with said cutting edge. Assume further that the power plant has been started in operation and that motion is now being transmitted to the saw through the intermeshed driving and driven gears, respectively, of my transmission mechanism G. As the assembly is fixed against movement about the axis of the driven shaft 27 by reason of the latching bolt 39, the saw will operate against the log L shown in dotted lines in Figure 3, and a feeding movement vertically downwards will be set up by reason of the action of the combined weight of the saw assembly. The frame of this assembly is quite thin, (see Figure 10), and the cut in the log, made by the teeth 77 of the saw, will be of ample width to allow the thin intermediate section of the saw frame to readily pass through the said cut. It is, of course, to be understood that at the option of the operator manual pressure in a feeding direction may be advanced against the hand grip end of the saw assembly if it be desired to more rapidly advance the work of cutting than is possible simply by the descending movement of the saw assembly by its own weight unhindered because of the free fulcrum action provided for by the wheeled support A.

When it is desired to employ the machine to effect other than vertical cuts, the saw assembly is adjusted angularly to a predetermined or desired position, and same is locked in said position by the bolt 39 in the manner aforementioned. The entire saw assembly along with the power plant B may be now moved by the raising and lowering mechanism H so that cuts can be readily made at various elevations. In the event that the cut to be effected is in a horizontal plane, it obviously follows that the operator will manipulate the saw assembly by applying necessary or sufficient force to the extreme outer end of the saw assembly so as to properly advance the saw in a feeding direction. In doing so, the machine moves about the vertical axis of the support A. Upon reference to Figure 6 of the drawings, it will be clear to one skilled in the art that the gear housing 16 may freely turn about the gear 31 when adjusting the saw to an intended angular position when other than vertical cuts are to be made. Because of the manner of mounting the saw assembly on the support A, horizontal cuts in positions very close to the ground line may be made, and I reiterate that this can be accomplished with much better success than is possible with a cross cut saw of the common well-known variety such as requires the laborious help of two operators to control its action.

I stress those features of the invention which bring into existence a satisfactory form of saw assembly whose frame structure is of such slight thickness that it will readily pass through a kerf formed by the saw. I feel that this feature and others elsewhere set forth herein lend admirably to the scheme of things that supplies the invention with a high measure of practical efficiency. The simple yet effective means I employed herein aids largely in the task of confining the machine in working proximity to the work being operated upon. The machine is of comparatively light weight; same may be easily conveyed from one place to another and satisfactorily operated in close quarters. It is strong and durable and its parts designed and constructed to allow for convenient replacement of parts as the need therefor arises.

What is claimed is:

1. A sawing machine comprising means mounted to turn about a supporting axis; a power plant mounted on said means at one side of said supporting axis; a driven saw mounted on said means and extending laterally therefrom at the opposite side of said supporting axis, the weight of which is sufficient to overbalance the weight of the power plant to thereby cause the saw to move vertically downwards and about said supporting axis and to effect a vertical cut; power transferring means connecting the power plant with the saw to drive the latter; means at the point of mounting between the saw and the first means enabling the saw to be angularly adjusted to a position to produce other than a vertical cut; and means for raising and lowering the power plant and the saw as a unit so that the saw can effect cuts at various elevations.

2. In a portable saw structure, a casing, a drive shaft extending longitudinally through said casing, a flat plate enclosing one end of said casing concentric to the drive shaft and rotatable in the casing, a saw supported by said plate, a retaining ring fixed to the casing and overlying the edge of said plate, driving connections between said shaft and saw, and means for locking said plate against rotation in different positions relative to the casing whereby the saw may be positioned at various cutting angles.

3. In a portable saw structure, a casing, a drive shaft extending longitudinally through said casing, a flat plate enclosing one end of said casing concentric to the drive shaft and rotatable in the casing, a saw supported by said plate, a retaining ring fixed to the casing and overlying the edge of said plate, driving connections between said shaft and saw, means for locking said plate against rotation in different positions relative to the casing whereby the saw may be positioned at various cutting angles, a motor connected with said drive shaft, and a horizontal pivotal support for said motor and saw.

GEORGE ARSNEAU.